United States Patent [19]

Muller

[11] Patent Number: 4,786,905

[45] Date of Patent: Nov. 22, 1988

[54] WIND SHEAR DETECTOR HEAD-UP DISPLAY SYSTEM

[75] Inventor: Hans R. Muller, Redmond, Wash.

[73] Assignee: Sundstrand Data Control, Inc., Redmond, Wash.

[21] Appl. No.: 844,046

[22] Filed: Mar. 26, 1986

[51] Int. Cl.⁴ .......................................... G01C 23/00
[52] U.S. Cl. .................................. 340/975; 33/328; 73/178 T; 340/967; 340/968
[58] Field of Search ............... 340/963, 971, 966–968, 340/972–975, 980; 73/178 R, 178 T, 180, 189; 33/328, 329; 364/434, 435; 244/181

[56] References Cited

U.S. PATENT DOCUMENTS

| | | | |
|---|---|---|---|
| 2,080,490 | 5/1937 | Kollsman | 340/967 |
| 2,896,145 | 7/1959 | Snodgrass | 340/974 |
| 2,941,400 | 6/1960 | Nesbitt | 340/973 |
| 3,162,834 | 12/1964 | Schweighofer et al. | 33/328 |
| 3,188,861 | 6/1965 | Miller | 340/966 |
| 3,206,974 | 9/1965 | Andresen | 73/180 |
| 3,307,191 | 2/1967 | Crane | 73/178 T |
| 3,427,581 | 2/1969 | Hartman . | |
| 3,648,232 | 3/1972 | White | 340/971 |
| 3,668,622 | 6/1972 | Gannett et al. | 340/727 |
| 3,686,626 | 8/1972 | Bateman et al. | 340/971 |
| 3,686,936 | 8/1972 | Daudt, Jr. | 340/966 |
| 3,824,535 | 7/1974 | Rover, Jr. | 340/975 |
| 3,851,303 | 11/1974 | Muller | 340/980 |
| 3,970,829 | 7/1976 | Melvin | 73/178 R |
| 4,012,713 | 3/1977 | Greene et al. | 73/178 R |
| 4,040,005 | 8/1977 | Melvin | 340/973 |
| 4,043,194 | 8/1977 | Tanner | 73/178 T |
| 4,044,975 | 8/1977 | Blechen et al. | 340/974 |
| 4,058,010 | 11/1977 | Woodhouse | 73/189 |
| 4,079,905 | 3/1978 | Greene | 73/178 R |
| 4,152,933 | 5/1979 | Woodhouse | 73/189 |
| 4,189,777 | 2/1980 | Kuntman | 364/433 |
| 4,347,572 | 8/1982 | Berwick, Jr. et al. | 364/433 |
| 4,368,517 | 1/1983 | Lovering | 73/178 T |
| 4,390,950 | 6/1983 | Muller | 340/968 |
| 4,554,545 | 11/1985 | Lowe | 340/980 |
| 4,590,475 | 5/1986 | Brown | 340/966 |
| 4,593,285 | 6/1986 | Miller et al. | 340/968 |

OTHER PUBLICATIONS

Airliner, "Windshear", Jan.–Mar. 1985, pp. 1–12.
"Head-Up Display for the MD-80", Sundstrand Data Control, Inc.

Primary Examiner—Donnie L. Crosland
Assistant Examiner—Brent A. Swarthout
Attorney, Agent, or Firm—Michael S. Yatsko; Trevor B. Joike; Harold A. Williamson

[57] ABSTRACT

An aircraft performance instrument which provides a first indicator which represents the line of level flight of the aircraft and a second indicator representative of the maximum permissible angle of attack of the aircraft.

7 Claims, 6 Drawing Sheets

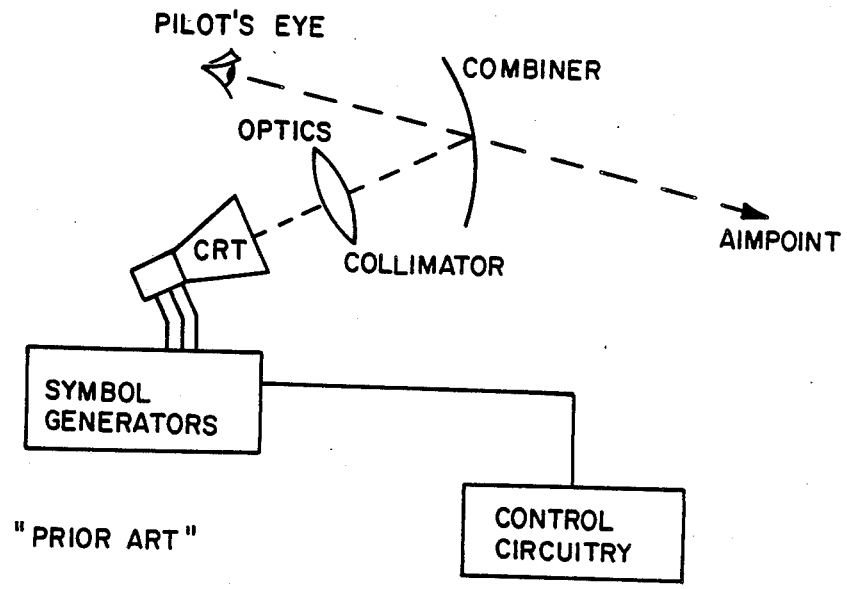
"PRIOR ART"
FIG. 2A
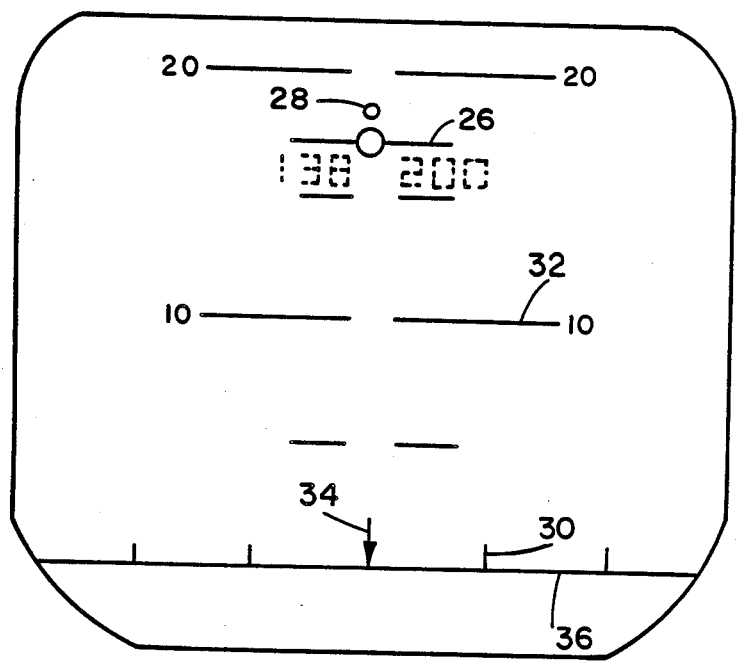
"PRIOR ART"   FIG. 2B

WIND SHEAR DETECTOR HEAD-UP DISPLAY SYSTEM

TECHNICAL FIELD

This invention relates to the field of aircraft instruments and, in particular, to a head-up display and instrument which provides guidance to the aircraft's pilot so as to enable the pilot to fly the aircraft safely during degraded performance such as during a wind shear condition.

BACKGROUND OF THE INVENTION

Various wind shear detection systems are known. Among these systems are ground based systems, such as those that utilize a plurality of wind speed and direction measuring stations placed about an airport in conjunction with a system for analyzing the magnitude and direction of the wind at the various stations to provide an indication of a wind shear condition. U.S. Pat. Nos. 4,058,010 and 4,152,933 are examples. Other ground based systems utilize Doppler radars located near the airport (see U.S. Pat. No. 3,427,581).

Airborne systems are also known. Among these systems are systems that compare air mass derived parameters, such as air speed, with ground speed derived from a radar system. In the event of a rapid change in air speed relative to ground speed, a wind shear condition is indicated. Other systems compare air mass derived signals with inertially derived signals to generate a signal representative of wind shear when the rate of change of inertially derived parameters varies from the rate of change of air mass derived parameters by a predetermined amount. Two such systems are disclosed in U.S. Nos. 4,012,713 and 4,079,905. Both of these patents disclose systems that compare a longitudinal accelerometer signal that has been corrected for the effect of gravity with an air speed rate signal and provide a wind shear warning signal when the difference between the accelerometer derived signal and the air speed derived signal exceeds a predetermined amount. The '905 patent also takes into account a downdraft drift angle that is a function of vertical acceleration and air speed. Still other systems monitor the rate of change of deviation from a glide slope beam or an ILS beam to provide a signal representative of wind shear.

While all of these systems do provide some indication of wind shear, the ground based systems are responsive only to conditions in the vicinity where the transducers are placed, and are not responsive to dangerous types of wind shear such as microbursts which form and dissipate rapidly. A microburst is an intense downdraft of cool air that, in some cases, drops 3,000 feet in two minutes. Such systems do not necessarily provide a timely warning to the pilot.

While airborne wind shear protection systems are more responsive to conditions in the vicinity of the aircraft than are ground based systems, many of them require Doppler Radar, an Inertial Navigation System, glide slope signals, or other signals that are not available on older or small aircraft. In addition, it is desirable to develop not only a warning of degraded aircraft performance, but also timely guidance to the pilot on how to safely fly the aircraft during this degraded performance condition, such as a wind shear condition.

There also have been teachings as to how aircraft performance is affected by wind shear (i.e., U.S. Pat. Nos. 4,043,194; 4,129,275; 4,281,383; 4,342,912 and 4,336,606). These teachings involve systems which are often difficult to implement in an aircraft cabin environment, may require the use of special sensors, or do not provide usable information in a timely manner.

Some systems have been devised which not only combine the detection of wind shear but also guidance information to the pilot. In U.S. Pat. No. 4,189,777, air speed rate is used to detect a wind shear condition and, in response thereto, a ground proximity warning system Mode 1 warning curve is modified to increase warning time. Another approach is reflected in U.S. Pat. No. 4,347,572. There, angle of attack, stick-shaker value, vertical speed, air speed, flap position and thrust are used to provide climb-out guidance on a pilot flight director display by indicating an appropriate pitch angle. U.S. Pat. No. 4,040,005 teaches a servo driver composit situation analyzer. There, a complex mechanical instrument is disclosed which, in one embodiment, displays angle of attack flight path angle relative to an aircraft reference and a runway. The suggestion is also made that a CRT display may be used in lieu of the mechanical display. However, the displayed information amounts to a presentation of deviations from desired values of angle of attack and desired flight path. More importantly, since it depends on the pilot to insert a desired value for the angle of attack, it has the potential for giving misleading information during rapidly changing flight conditions. The complexity of the display also makes it likely that the pilot will not use it during emergency situations wnen the aircraft is in sight of the ground.

In view of some recent aircraft accidents which have been attributed to wind shear and in view of maintaining the public's confidence in commercial aircraft, an aircraft instrument which provides timely guidance information to the pilot of tne aircraft so as to enable him to correctly guide the aircraft in a wind shear condition would be an instrument that would satisfy a clear long-felt need.

Tne fact that so many instrument systems and guidance systems have been proposed, and no one system has yet found acceptance by the industry, is an indication that these prior systems have been unsatisfactory and that the problem of providing guidance information to an aircraft pilot during a wind shear condition is one which has, so far, gone unsolved by the best minds in the industry. Clearly, a new approach to the problem is needed.

SUMMARY OF THE INVENTION

In accordance with one embodiment of the present invention, an aircraft head-up display is disclosed which provides, on a combiner, an aircraft symbol; a horizon line; a first symbol which is representative of the line of level flight; and a second symbol which is representative of the maximum permissible angle of attack. In one specific embodiment, the aircraft is provided witn a Stall Warning System which provides a signal representative of the stick-shaker angle of attack and a signal representative of the actual angle of attack of the aircraft, thereby providing a representation of the stall margin of tne aircraft. In that embodiment, the second symbol on the combiner is positioned by a signal formed by combining the stall margin signal and a pitch signal representative of the pitch of the aircraft. The pitch signal input improves flyability and damping. In that embodiment, the first symbol is positioned by a signal representative of the ratio of vertical speed to true air speed. Preferably, the vertical speed signal is the signal obtained by combining vertical speed and normal acceleration in a complementary filter.

In another embodiment, an aircraft instrument is disclosed which comprises a scale index, a display of the aircraft flight path angle relative to said scale index, and a display of tne aircraft stall margin relative to said scale index. Preferably, the scale index is disposed between the stall margin display and the flight path angle display and the instrument is in the form of a circular dial gage with a pointer indicating flight path angle and a peripheral concentric display of stall margin. A digital vertical speed display may also be included on the dial face.

As will be apparent from the discussion which follows, the two specific embodiments just described not only provide wind shear warning, but also a display which enables the pilot to recognize a dangerous wind shear condition, or other aircraft performance problem, and assist the pilot in safely flying the aircraft through such a condition.

One advantage of using a head-up display (HUD) is that it is especially well suited as a display element for providing aircraft guidance information inasmuch as it allows the pilot to simultaneously view the outside world and the super-imposed HUD guidance symbology. The pilots know that wind shear is especially dangerous when the aircraft is at a low altitude, such as during a landing approach or during take-off. At these times, the pilot is generally viewing the outside world and would be most appreciative of any instrument that would give him guidance and wind shear warning information without having to move his head towards a conventional array of instruments. However, a HUD is generally more expensive than a conventional instrument; therefore, a less expensive conventional dial instrument that provides the same information would still prove to be a valuable contribution to flight safety.

Numerous other advantages will become apparent from the following detailed description of the invention and its various embodiments, from the claims, and from the accompanying drawings.

Figure 4:
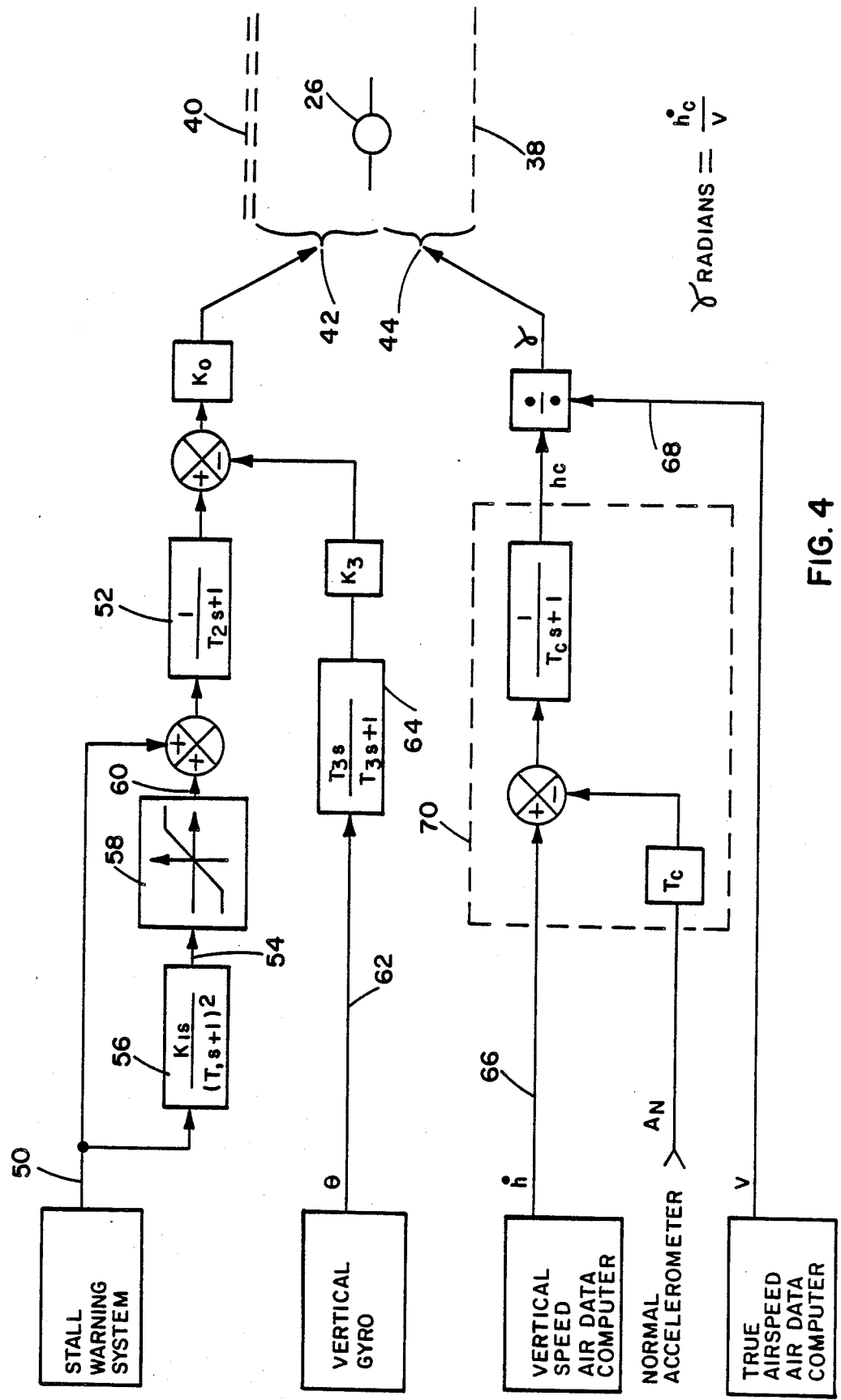
Figure 5:
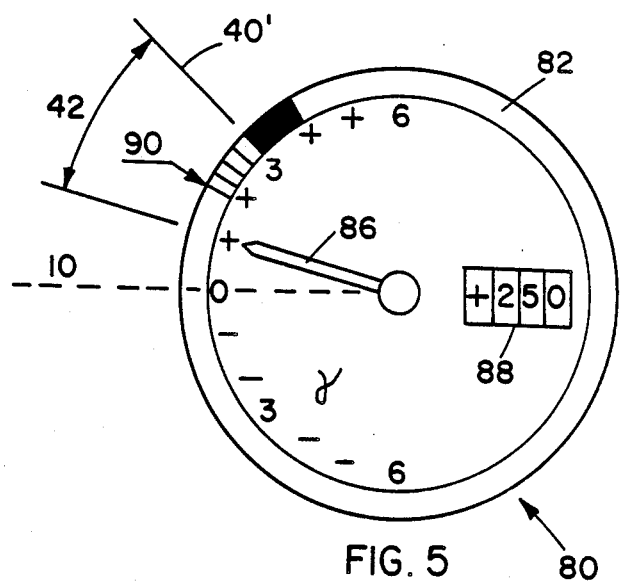

FIG's 2B, 2C and 2D depict the combiner screen of the head-up display shown in FIG. 2A which provides a display of flight path guidance information in accordance with the present invention;

FIG's 3A, 3B, 3C, 3D and 3E are simplified diagrams of the symbols provided on the head-up display in accordance with the present invention under various flight conditions;

FIG. 4 is a block diagram of one embodiment of the present invention showing a means by which control symbols may be derived so as to provide the display shown in FIG's 2 and 3; and FIG. 5 is another embodiment of the present invention providing aircraft guidance information in the form of a conventional dash board instrument.

DETAILED DESCRIPTION OF THE INVENTION

While this invention is susceptible of embodiment in many different forms, there is shown in the drawings and will herein be described in detail, several preferred embodiments of the invention. It should be understood, however, that the present disclosure is to be considered an exemplification of the principles of the invention and that it is not intended to limit the invention to the specific embodiments illustrated. To better explain the unique aspects of the invention, the principle of operation will first be described, and then specific embodiments will be explained which employ the principles of the invention.

Principle of Operation

Figure 1A:
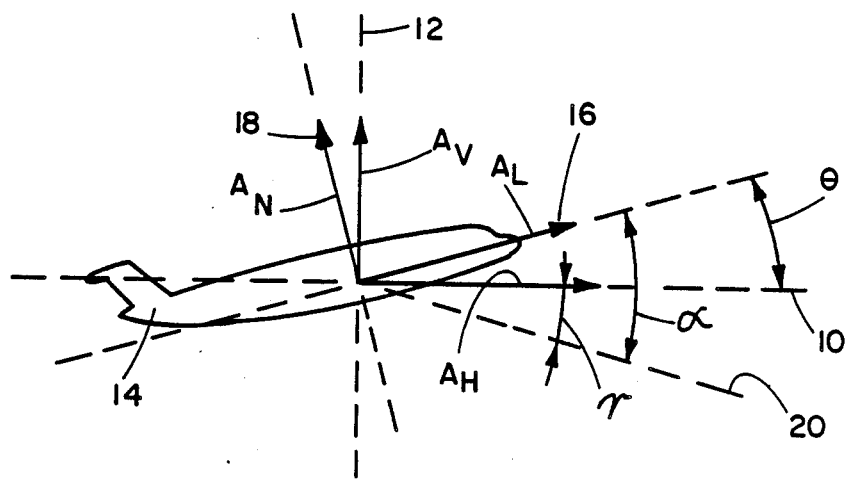
FIG. 1A is a diagramatic view of an aircraft showing the relationship between an aircraft flight path and the various parameters used to measure the attitude of the aircraft.

Referring to FIG. 1A, there is shown a pair of horizontal and vertical coordinates designated by the reference numerals 10 and 12, respectively. A representation of an aircraft 14 is also shown in FIG. 1A, and a pair of vectors 16 and 18 represent the longitudinal and normal axes of the body of the aircraft, with the vector 16 passing through the longitudinal center line of the aircraft and the vector 18 being perpendicular to the vector 16. A dashed line 20 represents the flight path of the aircraft 14, and in the illustration of FIG. 1A represents a descending flight path.

The angle between the horizontal axis 10 and the longitudinal axis 16 of the aircraft is defined as the pitch angle and represented by the symbol "$\theta$". The angle between the flight path 20 and the horizontal reference 10 is defined as the flight path angle and is represented by the symbol "$\gamma$". The angle between the longitudinal axis 16 of the aircraft 14 and the flight path 20 is known as the angle of attack of the aircraft and is represented by the symbol "$\alpha$". The flight path angle "$\gamma$" is negative for a descent and positive for ascent. Thus the pitch angle "$\theta$" is equal to the flight path angle "$\gamma$" plus the angle of attack "$\alpha$".

It is also important to understand the various accelerations and accelerometer signals affecting the aircraft. One such signal is a longitudinal accelerometer signal $A_L$ which is the signal obtained from an accelerometer mounted parallel to the longitudinal axis 16 of the aircraft 14. The signal from the longitudinal accelerometer is a function of the longitudinal acceleration of the aircraft 14, and because of the influence of gravity, the pitch angle. Another such signal is the normal accelerometer signal $A_N$ which is the signal obtained from an accelerometer positioned parallel to the normal axis 18 of the aircraft 14. The normal accelerometer signal is a function of acceleration along the normal axis of the aircraft 14 as well as gravity and pitch angle. Horizontal acceleration $A_H$ is a signal representative of acceleration along the horizontal axis 10. An accelerometer mounted parallel to the horizontal axis 10 would provide the horizontal acceleration signal $A_H$. Finally, a vertical acceleration signal $A_V$ is a signal representative of acceleration along the vertical axis 12. An accelerometer mounted parallel to the vertical axis 12 would provide a signal representative of the sum of any vertical acceleration and the effects of gravity, "g" or 32.2 feet/second$^2$.

Recapitulating the various accelerations and angles to be considered are as follows:

$A_N$ = N normal accelerometer signal
$A_L$ = longitudinal accelerometer signal $A_H$ = horizontal acceleration
$A_V$ = vertical acceleration
g = gravity = 32.2 feesecond
α = angle of attack (AOA)
γ flight path angle
θ = pitch angle = α+γ

In determining some of the parameters, other parameters will be required. These include:
ḣ = barometric altitude rate
V = air speed
and for small angles:
γ = ḣ/v
where "γ" is in radians.

Figure 1B:
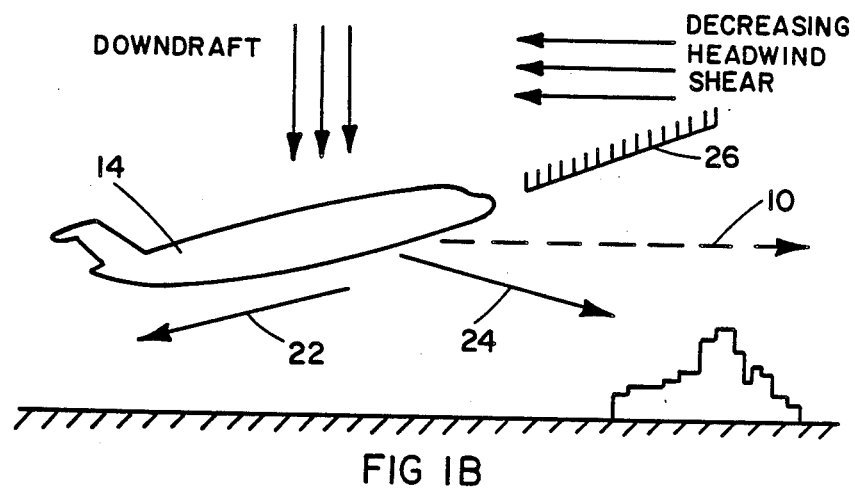
FIG. 1B is a pictorial representation of an aircraft relative to the constraints imposed upon the pilot in contolling the aircraft.

A particular severe performance problem exists when the aircraft flies through a microburst during take-off or when the aircraft encounters a wind shear condition during its approach that is severe enough to require a "go around". Referring to FIG. 1B, a microburst exhibits both downdrafts as well as strong horizontal wind shears. Downdrafts, coupled with decreasing headwind or increasing tailwind shears, will cause the aircraft 14 to simultaneously lose air speed 22 and climb gradient. Even if the pilot selects maximum available thrust, the aircraft might not be able to out accelerate the horizontal shear and maintain an adequate climb gradient. Tne downdraft causes a decrease in aircraft angle of attack for a given pitch attitude; in other words, the pilot has to pitch-up to an abnormally high pitch attitude just to maintain an angle-of-attack equivalent to a non-shear condition.

Thus, under such abnormal conditions, the pilot, after having selected maximum available thrust, has to control the airplane between the following two constraints:

(1) He has to try to increase angle of attack to maintain a positive climb rate to avoid terrain contact 24.

(2) He has to prevent the aircraft from stalling 26. Clearly, during such conditions, the pilot needs guidance that is not ambiguous, and that is presented in such a manner as to show the safety margins available.

Turning now to FIG. 2A, a block diagram of an elementary head-up display (HUD) is illustrated. Bascially, such a display is provided by projecting tne output of a CRT through a set of optics on a semi-transparent screen or combiner. The combiner is disposed between the aircraft pilot's eye and an aim point exterior to the aircraft. The CRT displays images, including appropriate symbols, as directed by appropriate control circuitry. The apparatus of FIG. 2A is well known to those skilled in the art and is otherwise discussed in such patents as U.S. Pat. Nos. 3,686,626, 3,851,303, 3,967,799, and 4,390,950. One commercial embodiment is the MD-80 made by the Sundstrand Corporation, Sundstrand Data Control, Inc. in Redmond, Washington.

Turning now to FIG. 2B, the image formed on the combiner of FIG. 2A is illustrated. Specifically, the display includes an aircraft symbol 26, an aim symbol or "aimdot" 28, a horizon line 30 and a pitch ladder 32. The aircraft symbol 26 symbolizes an aft view of an aircraft controlled by the pilot to correspond to motions of his aircraft. During an approach, the pilot "flies" the aircraft symbol 26 to keep it centered on the aimdot 28. The display may also be provided with an indicator 34 which moves relative to a horizontal scale 36 to depict the aircraft's heading, airspeed (i.e., 138 kts) and digital radio altitude (i.e., 200 ft.) Thus, the display shown in FIG. 2B is conventional.

In the case of the MD-80 HUD, the aircraft symbol 26 is displayed fixed in a location representing the roll axis of the aircraft (i.e., an axis perpendicular to the plane of FIG. 2B). The horizon line 30 and the pitch ladder 32 are displayed "conformal" to the external or real world. This means that the horizon line 30 overlays the true horizon independent of the aircraft pitch or roll attitude. In other words, the pitch ladder 32 and the horizon line 30 are pitch and roll stablized and indicate pitch and roll when compared to the fixed airplane symbol. Finally, the aimdot 28 moves relative to the airplane symbol and represents a "command" from the flight director portion of the HUD.

Figure 2C:
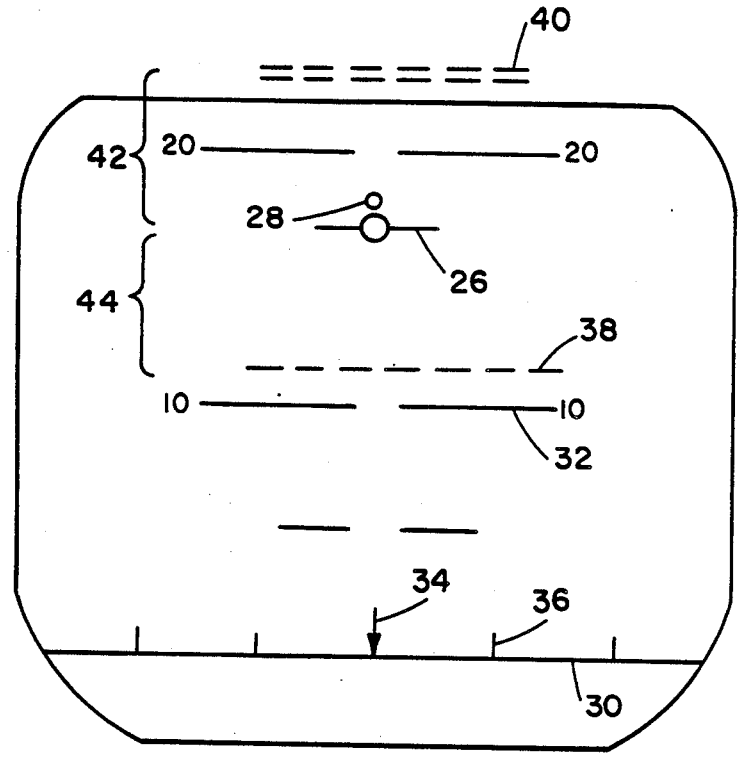
FIG. 2A is a block diagram of a typical head-up display.

In FIG. 2C, a HUD combiner is depicted which has two additional symbols imposed thereon in accordance with the present invention. Specifically, there is illustrated a single dashed line 38 representing the level flight line and a double dashed line 40 representing the maximum angle of attack. Thus, these two symbols form a "take-off window" inside of which the aircraft symbol 26 is located under normal flight conditions. The take-off window is roll stabilized about the aircraft roll axis like the horizon line 30 and the pitch ladder 32. The displacement or location 42 of the upper dashed line 40 or upper window limit, relative to the aircraft symbol 26 is representative of or indicates the stall margin of the aircraft (i.e., stick-shaker angle of attack minus actual angle of attack). If the aircraft stall margin is large, the upper dashed line 40 might be out of view, as specifically shown in FIG. 2C. The relative location of the single dashed line 38, compared to the aircraft symbol 26, is representative of the flight path angle "γ" of the aircraft 44. As long as the aircraft is climbing, the aircraft symbol 26 is above the lower limit 38. Therefore, the "size" of the take-off window is a measure of the take-off performance capability of the aircraft. More importantly, a take-off performance problem is immediately evident by a shrinking window size and/or the aircraft symbol being outside of the display window.

Figure 2D:
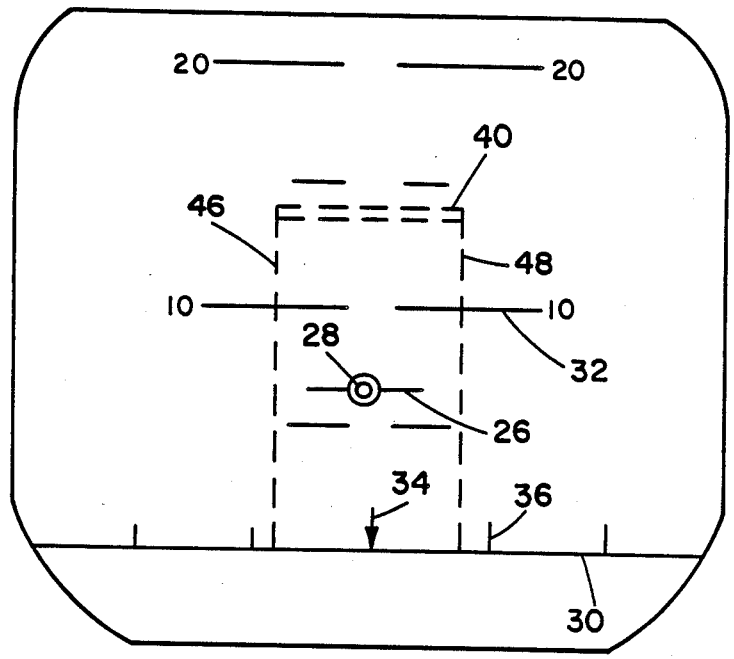

Another embodiment of the present invention implementing the take-off window concept is shown in FIG. 2D. In this implementation, the head-up display of the model MD-80 HUD has been modified by letting the aircraft symbol 26 represent flight path angle relative to the real world and the horizon line 30. Thus, the horizon line 30 indicates the level flight line in relation to the aircraft symbol 26. As long as the aircraft is climbing, the aircraft symbol 26 is above the horizon line 30. The take-off window is still displayed relative to the aircraft symbol and is essentially the same, except that its lower limit can now be replaced by a horizon line and no separate symbol is required.

Tne window concept can be accentuated by connecting the two horizontal limit lines 38 and 40 with vertical lines 46 and 48 and by laterally moving the window relative to the aircraft symbol 26 as a function of Heading Error "E" (i.e. desired heading minus actual heading). Similarly, an aircraft symbol 26 may be manipulated to show rotation about the aircraft's roll axis (i.e., see FIG. 3B). In that case, the window would be "roll stabilized".

Figure 3A:
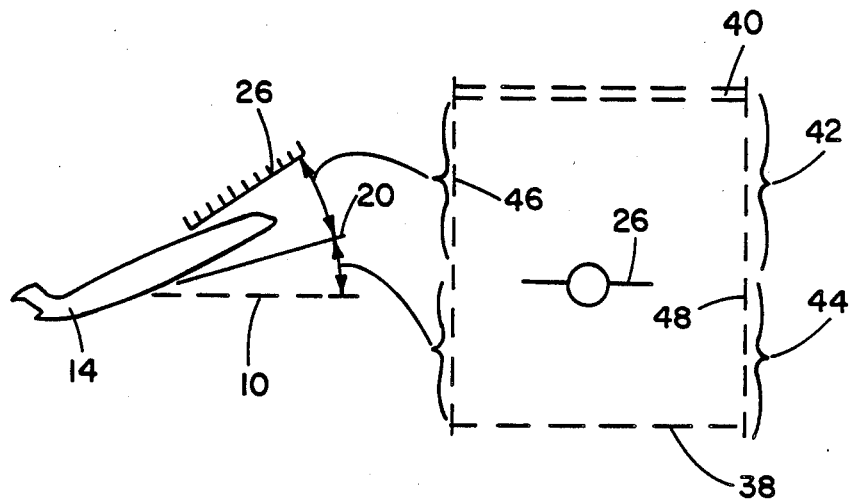
Figure 3B:
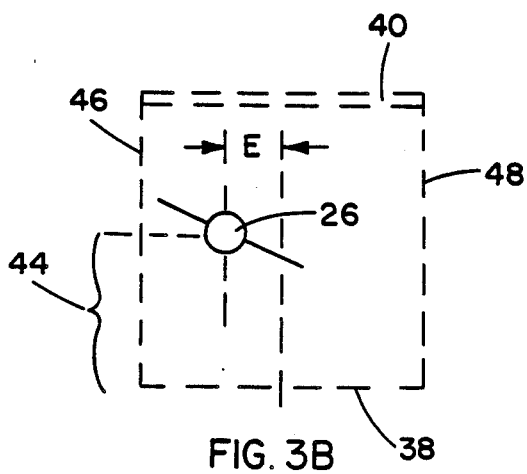
Figure 3C:
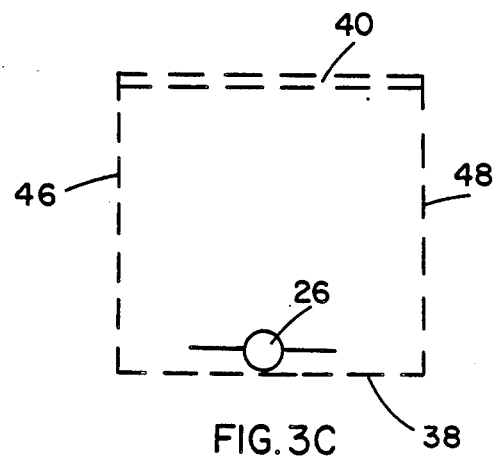
Figure 3D:
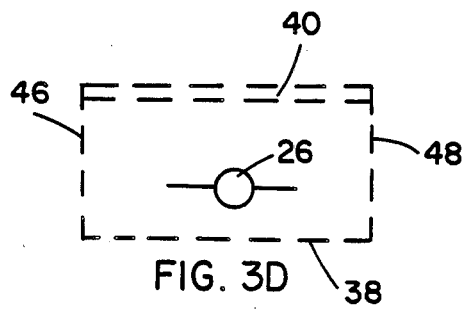
Figure 3E:
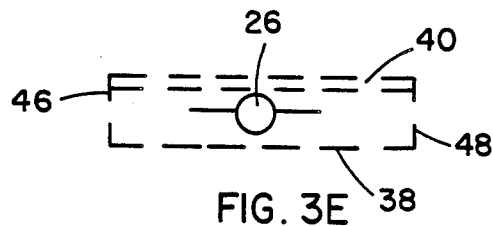

Scenarios showing various flight performance situations are shown in FIG's. 3A 3C, 3D and 3E. FIG. 3A corresponds to FIG. 2D with a separate line 38 used in lieu of the horizon line 30. Specifically, FIG. 3C illustrates the display presented to a pilot in the case of marginal climb performance. FIG. 3D illustrates shrinking stall margin, and FIG. 3E illlustrates an emergency situation, whereby the pilot has to use his judgment to trade flight path angle for stall margin. It should be evident that the take-off window concept not only indicates performance problems due to wind shear, but also problems due to inadequate thrust, excessive drag or improper flight path control (i.e., sinking after take-off).

Control System

A block diagram of a control system for implementing the head-up display just described is shown in FIG. 4. Specifically, the position of the upper window limit 40 relative to the aircraft symbol 26 is essentially controlled by "stall margin", a stall margin signal 50, which is considered to be the difference between the "stick-shaker angle of attack" and actual aircraft angle of attack. Modern aircraft are provided with stall warning systems which can provide such an output signal. The stick-shaker is an impending stall warning device and, in the case of jet transport aircraft, is automatically activated when the angle of attack is at a "never exceed" value corresponding to an airspeed about 10% above the stall value. To reduce the effects of turbulence, the stall margin signal 50 is filtered in a standard first order lag type filter 52. A rate signal 54, generated by a differentiator circuit 56, is fed to a limiter 58 to limit the rate signals generated by the differentiator 56 to rates typical for the motion of the aircraft in which the system is installed. The output signal 60 from the limiter 58 is combined with the unfiltered stall margin signal 50 and both are fed to the turbulence filter 52 to reduce its overall lag effect without significantly reducing its turbulence filtering function. To improve flyability and damping, a pitch signal 62 from a vertical gyro is put through a wash-out filter 64 and then subtracted from the output of the turbulence filter 52.

As long as the aircraft angle of attack is below the stick-shaker activation point, the stall margin signal 50 is positive and the upper window limit 40 is above the aircraft symbol 26 (see FIG. 3A). As the aircraft angle of attack reaches the stick-shaker activation point, the upper window limit 40 will coincide with the aircraft symbol 26 (see FIG. 3E). Under normal conditions, the take-off window acts as a situation display. In emergency situations, however, the pilot can use the upper window limit 40 as a guidance symbol to fly the aircraft at its maximum allowable angle of attack for a limited amount of time.

The control law for the lower window limit 38 is flight path angle "$\gamma$". As long as the flight path of the aircraft is positive (i.e., climbing) the aircraft symbol 26 is above the lower window limit 38 (see FIG. 3A). The preferred signal source for the flight path angle is the aircraft's Inertial Reference System (IRS). For aircraft which do not have an IRS, the flight path angle may be computed from a vertical speed signal 66 and true air speed 68. A standard complementary filter 70 is employed to filter a vertical speed signal 66 obtained from the aircraft's air data computer or from the rate of change of barometric altitude and to complement it with a signal representative of normal acceleration $A_N$ to restore responsiveness.

Relatively recent wind shear related accidents have indicated that pilots were reluctant to counteract the wind shear by increasing the angle of attack to an optimum level. A downdraft, coupled with a decreasing head wind shear, decreases the angle of attack and air speed simultaneously (see FIG. 1B). This abnormally high pitch attitude is uncomfortable to the pilot especially when flying close to the ground and, therefore, there is reasonable anxiety that the aircraft will reach a stall condition. The HUD just described should reduce this anxiety factor inasmuch as it keeps the pilot simultaneously aware of his stall margin and flight path angle while allowing the pilot to view the outside world and manuever free of ground obstructions. To counteract the decreased angle of attack, a pitch attitude higher than normal is required. Under some critical wind shear situations, the aircraft cannot accelerate to make up the air speed loss and to simultaneously climb to counteract the downdraft.

FIG. 5 illustrates another embodiment of the invention. Here, instead of using a head-up display, a modified vertical speed indicator is presented. Specifically, the indicator 80 displays flight path angle "$\gamma$" instead of vertical speed 88 alone. A moving angle of attack index 82 on the periphery of the indicator 80 provides a display of stall margin 42 and optimum angle of attack 90 guidance when read relative to the flight path angle indicating needle 86. Such an instrument would show both constraints (see FIG. 1B) that the pilot faces when flying through a severe wind shear. The flight path angle index 86 indicates whether the aircraft maintains a positive climb gradient and the angle of attack index 82 shows how close the aircraft is to being stalled or the optimum angle of attack 90. Preferably, for further guidance, the instrument of FIG. 5 may be provided with a readout 88 in digital form of the aircraft's vertical speed.

From the foregoing, it will be observed that numerous variations and modifications may be effected without departing from the spirit and scope of the novel concept of the invention. For example, a digital voice synthesizer may be included or one or more warning lights may be provided to alert the pilot that any one of the window limits 38 and 40 have decreased to some preselected value. Similarly, further enhancements or display information may be added to the combiner screen to provide additional guidance to the pilot of the aircraft. It should be understood, however, that no limitation with respect to the specific apparatus illustrated herein is included or should be inferred. It is, of course, intended to cover by dependent claims all such modifications as fall within the scope of the claims.

I claim:

1. An aircraft instrument especially useful for providing guidance to the pilot of an aircraft when encountering windshear during a take-off or a go-around phase of flight, comprising:
   (a) a scale index, located on a circular dial face;
   (b) flight path angle signaling means for providing a signal representative of the aircraft flight path angle;
   (c) path means for displaying, relative to said scale index, the aircraft flight path angle, said path means comprising a pointer driven by said signal representative of the aircraft flight path angle, said pointer being pivoted about the center of said dial face; and
   (d) stall means for displaying, relative to said pointer, the aircraft stall margin.

2. The instrument of claim 1, wherein said stall means is concentrically disposed relative to said pointer.

3. The instrument of claim 1, wherein said scale index is disposed between said stall means and said pointer.

4. An aircraft instrument for indicating the performance margin of the aircraft during take-off or a go-around phase of flight and for assisting the pilot of the aircraft in responding to a windshear encounter, comprising:
 (a) flight path angle means for displaying the flight path angle of the aircraft relative to a scale calibrated in degrees; and
 (b) maximum angle of attack means for displaying relative to said scale and said display of said flight path angle the margin to the maximum permissible angle of attack, said maximum angle of attack means being driven by a Stall Warning System which operates in response to aircraft flight parameters.

5. The instrument of claim 4, wherein said scale is on a circular dial face.

6. The instrument of claim 5, wherein said flight path angle means comprises:
 a pointer rotationally disposed at the center of said dial face.

7. The instrument of claim 6, wherein said maximum angle of attack means comprises at least a portion of a circular dial which is rotationally disposed at the outer periphery of said dial face and which is indexed to said pointer.

* * * * *